(12) United States Patent
Takahashi

(10) Patent No.: US 6,182,432 B1
(45) Date of Patent: Feb. 6, 2001

(54) HAULING CORD

(76) Inventor: Minoru Takahashi, 26-7, Uemachi 1-chome, Chuo-ku, Osaka (JP)

( * ) Notice: Under 35 U.S.C. 154(b), the term of this patent shall be extended for 0 days.

(21) Appl. No.: 09/252,747

(22) Filed: Feb. 19, 1999

(51) Int. Cl.[7] .................................................. D02G 3/02
(52) U.S. Cl. ............................................. 57/200; 57/206
(58) Field of Search .............................. 57/200, 206, 234, 57/248; 254/134.3 FT; 428/397

(56) References Cited

U.S. PATENT DOCUMENTS

| | | | |
|---|---|---|---|
| 2,799,133 | * | 7/1957 | Rose ........................................ 57/206 |
| 3,023,483 | * | 3/1962 | Steiner ................................... 57/206 |
| 3,205,648 | * | 9/1965 | Lohrke .................................... 57/206 |
| 4,333,306 | * | 6/1982 | Yamashita .............................. 57/206 |
| 4,805,393 | * | 2/1989 | Reta ........................................ 57/248 |
| 4,827,708 | * | 5/1989 | Verrect ................................... 57/206 |

FOREIGN PATENT DOCUMENTS

| | | |
|---|---|---|
| 61-22424 | 7/1986 | (JP) . |
| 4-16566 | 4/1992 | (JP) . |

* cited by examiner

Primary Examiner—Rodney M. Lindsey
(74) Attorney, Agent, or Firm—Jordan and Hamburg LLP

(57) ABSTRACT

A hauling cord (L) for pulling an electric power line or the like cable into a conduit has an elongate linear body (1) that is typically a monofilament of a thermoplastic resin. The cord is of a regular or irregular cross section with one or more helical ridges (2) that extend around, along and integral with the linear body between opposite ends of the linear body. The helical ridges are formed by drawing and twisting a raw material of the linear body, and may have either of or both the opposite ends made thinner and/or twisted stronger than the remaining portion so that the pitch between the adjacent ridges is reduced. The cross section renders the cord lighter in weight and more slender, and nevertheless its compression strength and tensile strength are improved.

24 Claims, 5 Drawing Sheets

HAULING CORD

BACKGROUND OF THE INVENTION

1. Field of the Invention

The present invention relates to a linear and flexible article designed to pull in and dispose through a protective conduit a cable such as a power cable, a telephone line or an optical-fiber cable. The linear articles of this kind are called "hauling cords" or "fish tapes" in the industries (and the former name will be used herein).

2. Prior Art

FIG. 10 shows a typical example 'T' of such hauling cords, as disclosed in the Japanese Utility Model Publication No. Sho.61-22424 (issued in 1986). This hauling cord 'T' usually consists of three extruded and drawn polyester resin filaments 01, wherein these filaments have been intertwisted and simultaneously hot set to permanently maintain their twisted configuration like a three-ply thread. Another Utility Model Publication No. Hei. 4-16566 (issued in 1992) discloses a modified hauling cord. The three filaments constituting this intertwisted hauling cord are bonded together along and at their regions that are in contact with each other, to thereby provide a substantially integral linear member.

FIG. 11 illustrates how to use such an intertwisted hauling cord 'T'. A flexible wire 'Y' may be connected at its one end by a cylindrical joint 'S' to one end of the hauling cord. A guiding end 'G' having a hole 'h' for holding the cable may be attached to the other end of the relatively short flexible wire 'Y', to thereby form a finished hauling cord for commercial and practical use. However for the purpose of simpler and concise description, the unfinished cords to which any additional wire etc. have not yet been attached will herein be referred to simply as "hauling cords".

Those three-ply type prior art hauling cords 'T' have been employed long, widely and conveniently since the application date of the first mentioned Utility Model first mentioned above. However, the protective conduits for the various cables have recently been increasing their length and nowadays those conduits are often bent in a complicated fashion. As a result, it has been required these days not only to elongate each hauling cord but also to render same lighter in weight and easier to use and improve its compression strength as well as its tensile strength.

SUMMARY OF THE INVENTION

The present inventor has made studies and conducted researches to meet such recent requirements. An object of the present invention is thus to provide a hauling cord whose overall weight and volume are not raised and whose compression strength is nevertheless improved as compared with the prior art three-ply cords so as to enable it to be forced in and through any elongated conduits.

In order to achieve this object, a synthetic plastic resin will be extruded to form a monofilament of a polygonal cross section and then drawn and self-twisted (not "intertwisted") to provide a hauling cord in such a manner that the cord has a helical ridge along it and around an outer periphery thereof.

Preferably, the hauling cord may have at least one end region where a pitch of the helical ridge is smaller than that in other regions of said cord.

Alternatively, the hauling cord may have at least one end region made thinner than other regions of said cord.

In practice of the present invention, it is desirable that the polygonal cross section of the monofilament is of a regular configuration such as an equilateral triangle, a regular square, a regular pentagon, a regular hexagon or the like. However, the cross section of the body of hauling cord may alternatively be of an irregular configuration insofar as it has at least one helical ridge.

The region where the pitch of helical ridge is reduced by a stronger twisting may be disposed at either of or both the longitudinal ends of the cord.

Likewise, the thinner region may be disposed at either or both the longitudinal ends of the cord. Such a region or regions may be twisted more times than the remaining mediate region.

THE PREFERRED EMBODIMENTS

Figure 1:
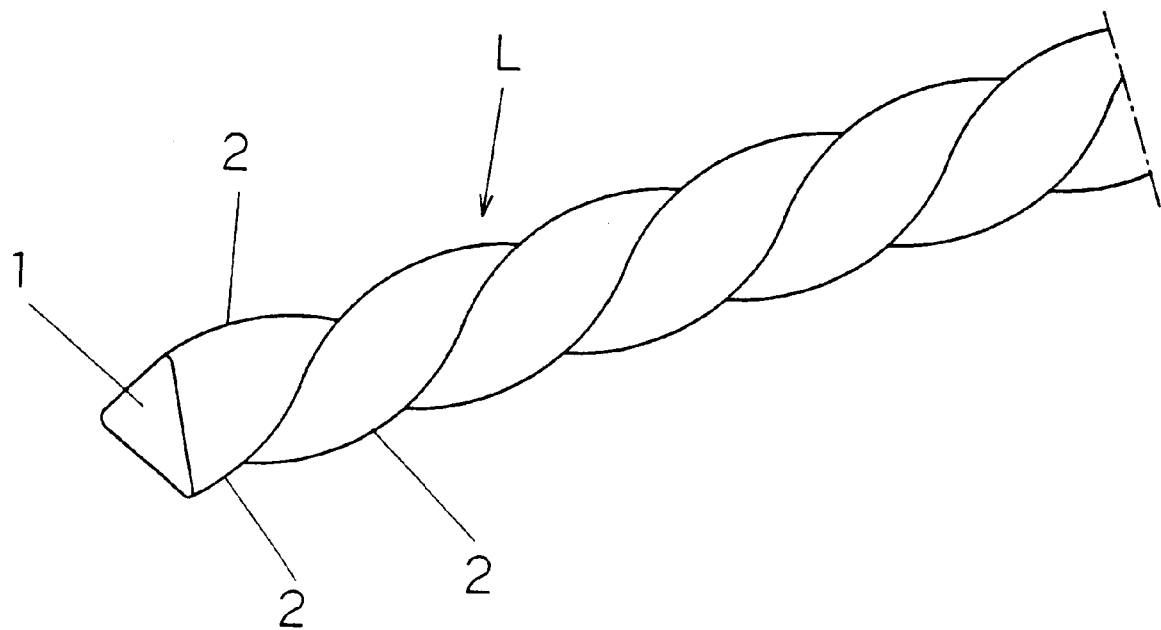
FIG. 1 is a perspective view of a self-twisted hauling cord provided in an embodiment of the present invention and shown in part.
Figure 2:
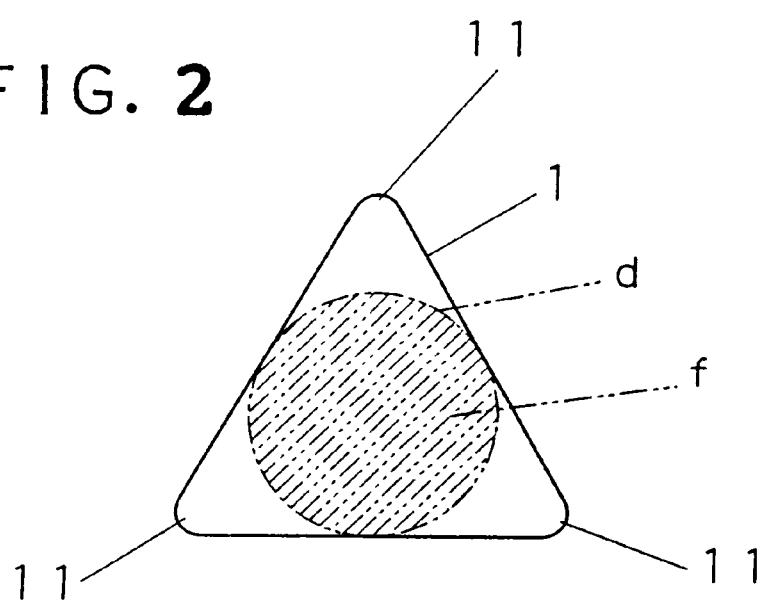
FIG. 2 is an enlarged side elevation of the cord.
Figure 3:
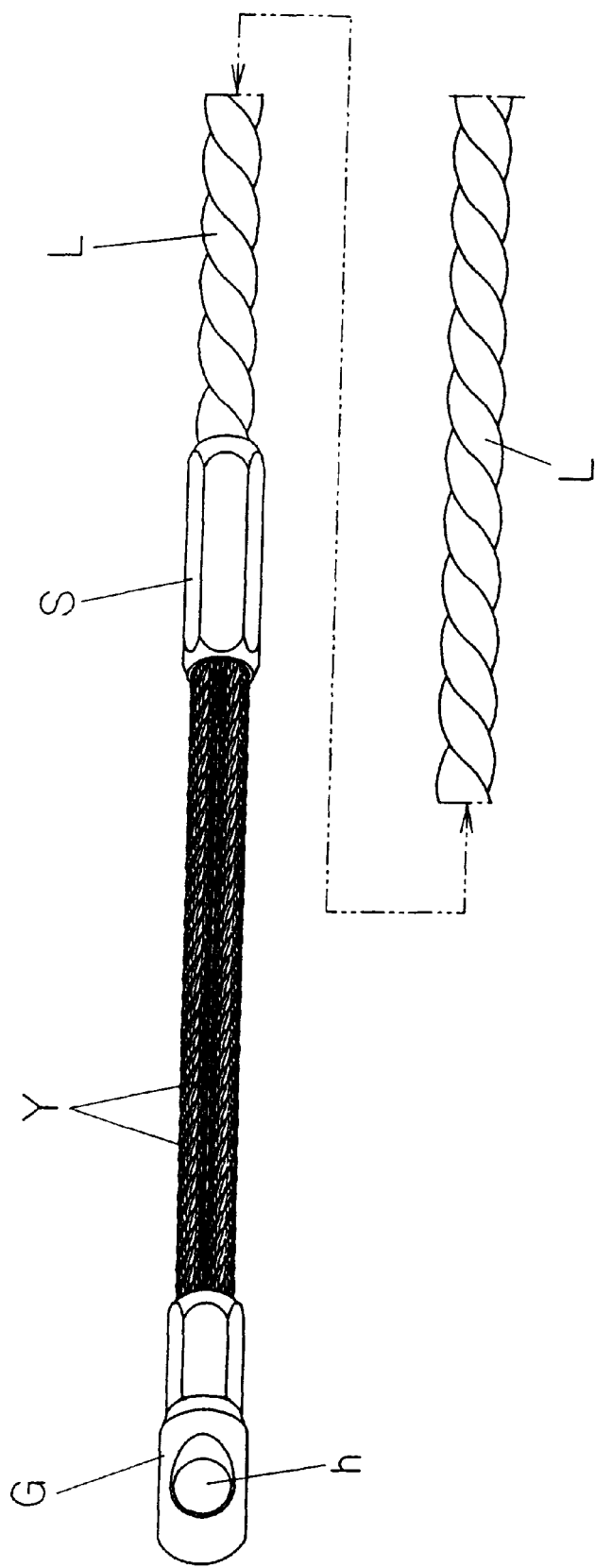
FIG. 3 is a front elevation of the cord having an end to which a cooperating member is attached.

A raw linear member for preparation of a monofilament 1 shown in FIGS. 1 to 3 is prepared by extruding a thermoplastic polyester resin through a die of an extruder. The raw linear member thus having an equilaterally triangular cross section whose edges may or may not be chamfered has been hot drawn in a longitudinal direction to a given ratio, before cooling down or being forcibly quenched to be wound up on a drum or the like. At a succeeding step, the raw linear member will be wound off the drum so as to be self-twisted while advancing through a heating chamber or on a heating device and subsequently be cooled. The number of permanent twist thus given to the monofilament may be 20, 25, 30, 35, 40, 50, 60, 70 or so turns per meter. Three corners 11 of the triangle will provide three helical ridges 2 around and along the self-twisted hauling cord 'L'.

A cross section of the hauling cord 'L' is of an equilaterally triangular shape having an imaginary inscribed circle 'd'. This circle 'd' has three points of tangency at medians of the three sides defining that triangle, as seen in FIG. 2. A considerably large area 'f' hatched with phantom lines and surrounded by the inscribed circle 'd' extends over the full length of this cord 'L'. Thanks to such a large central area 'f', a sufficient strength withstanding axial compression as well as a high tensile strength are afforded to this hauling cord. Further, the three helical ridges 2 corresponding to three corners 11 of that triangle will bear well the weight of such a cord 'L' in a pointed or linear contact fashion, thereby diminishing or minimizing frictional resistance of the cord against the inner periphery of a protective conduit To finish and commercialize the raw hauling cord as discussed above, a cylindrical connector 'S' may be used in a manner shown in FIG. 3 in order to attach a flexible wire 'Y' to one end of said cord 'L' having helical ridges. The flexible wire has at its another end to which secured is a guide piece 'G' that comprises a hole 'h' for hooking an end of an electric power line or the like to be introduced in and through a conduit. These members constitute as a whole a finished hauling cord for practical use. The guide piece 'G' may be secured additionally to another end of the body of the body of said raw hauling cord 'L'. It will also be possible that the guide piece or pieces 'G' is or are directly fixed on the end or ends of said cord's body.

The present inventor has tested some samples of the raw elongate material 1, wherein the latter was twisted to have 20, 25, 30, 35, 40, 50 60 or 70 turns per meter (hereafter abbreviated as 'TPM'), varying the pitches between the adjacent turns of the helical ridges 2. As a result, compression strength and tensile strength have not been found to substantially change among those samples. Specimens each of a length of 20 cm were taken from said samples for measurement of cord's flexibility. The specimens of 20 to 30 TPM did not differ from each other with respect to their flexibility, but the latter was improved generally in proportion to the value of TPM at 35 or higher TPM values, and more remarkably at 50 or higher TPM values.

Figure 4:
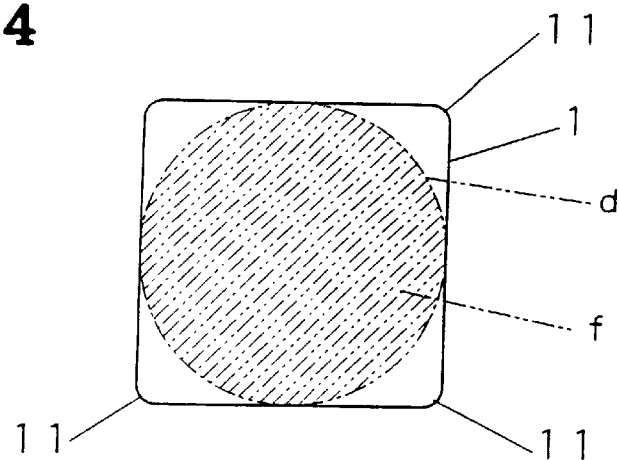
FIG. 4 is a side elevation of the cord provided in another embodiment.
Figure 5:
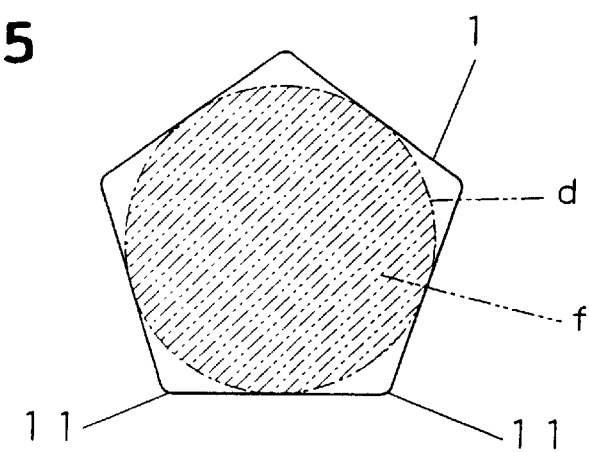
FIG. 5 is a side elevation of the cord provided in still another embodiment.
Figure 6:
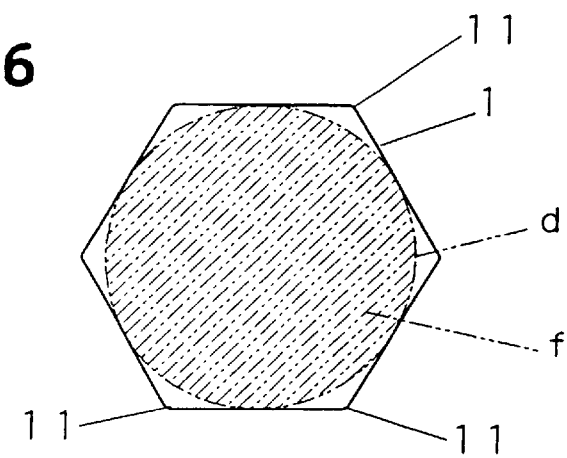
FIG. 6 is a side elevation of the cord provided in still yet another embodiment.

Modified cross sections of the raw elongate material 1 forming the hauling cord are shown in FIGS. 4 to 6. FIG. 4 illustrates a generally regular square cross section that provides four helical ridges, whereas FIGS. 5 and 6 show a regularly pentagonal or hexagonal cross sections providing five or six helical ridges, respectively.

Figure 7:
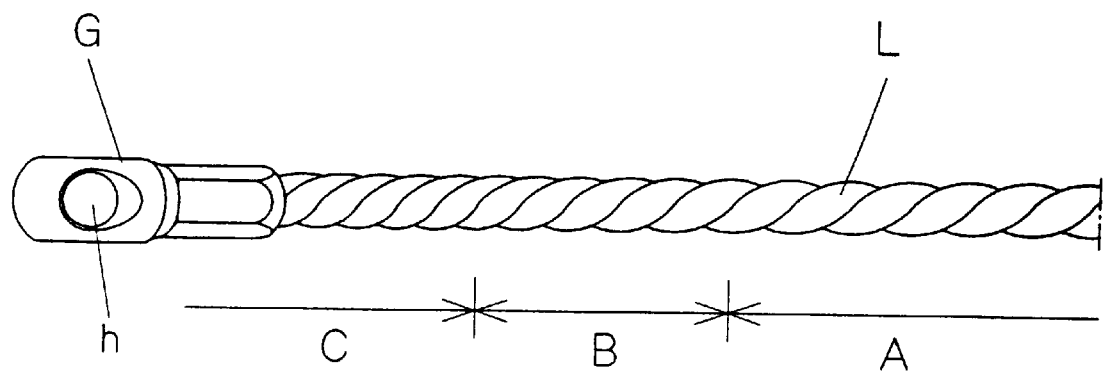
FIG. 7 is a front elevation of the cord provided in a further embodiment.

FIG. 7 illustrates a second embodiment in which the hauling cord 'L' has one end portion (located at left-hand region in the drawings) 'C' where twisting turns per unit length is increased to reduce the pitch between the adjacent ridges. An intermediate region 'B' having a medium TPM intervenes between the end portion 'C' and a major normal portion 'A'. Such an end portion twisted stronger, that will be more flexible than the other portions such that the flexible wire 'Y' can be dispensed with if so desired, can more smoothly advance even through complicatedly bent regions of a protective conduit. It is a matter of course that the hauling cord 'L' may have both the end portions thereof twisted stronger than its mediate main portion.

Figure 8:
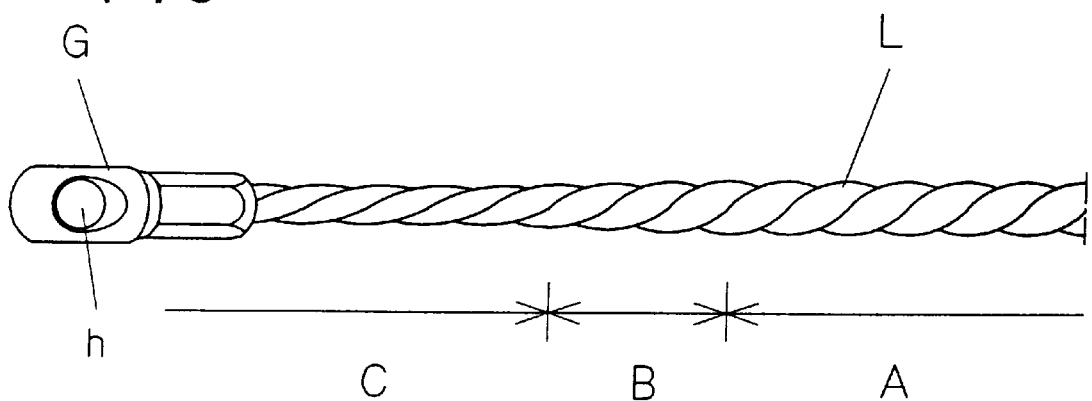
FIG. 8 is a front elevation of the cord provided in a still further embodiment.

In a third embodiment shown in FIG. 8, cross-sectional area of the main portion 'A' of cord 'L' gradually decreases through a transit region 'B' toward an end portion 'C'. This feature is also effective to render more flexible the end portion such that any flexible wire 'Y' need not be added thereto.

Figure 9:
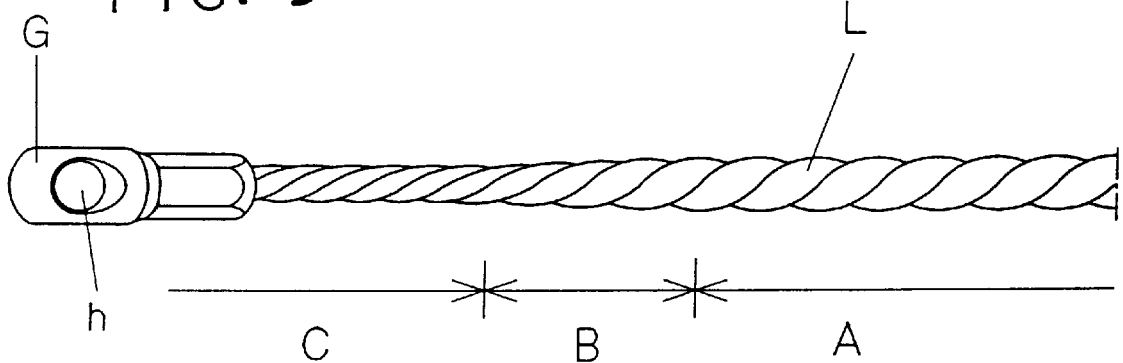
FIG. 9 is a front elevation of the cord provided in a yet still further embodiment.
Figure 10:
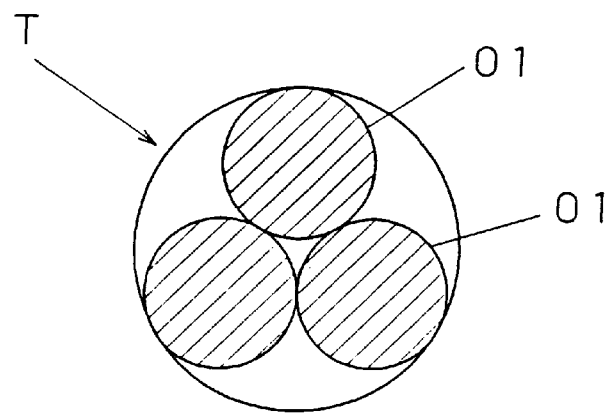
FIG. 10 is an enlarged side elevation of an intertwisted hauling cord provided in the prior art.
Figure 11:
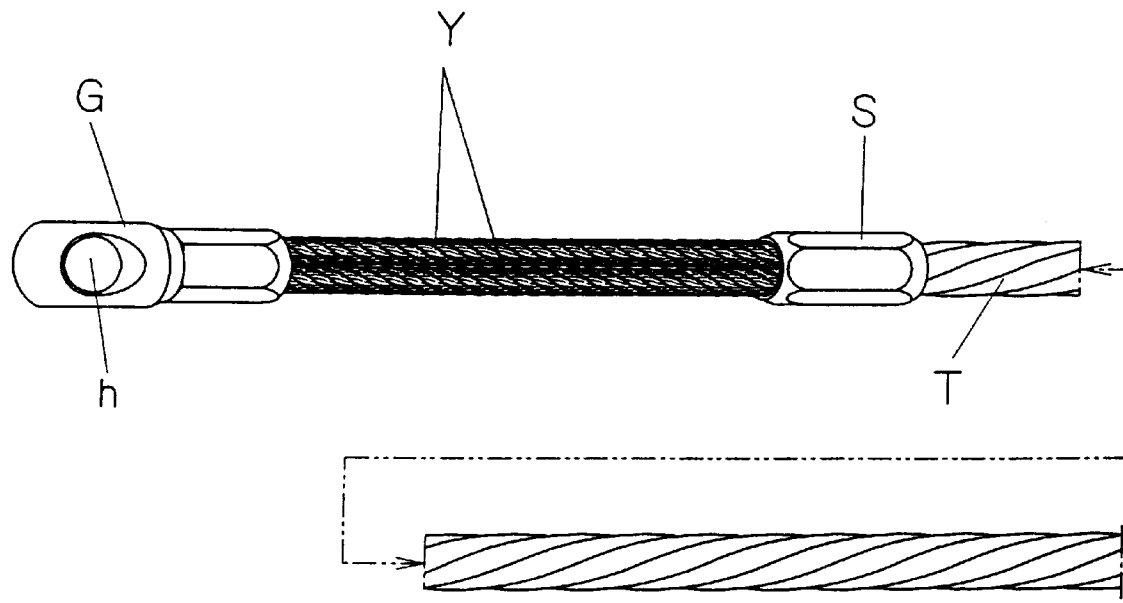
FIG. 11 is a front elevation of the prior art cord, shown in a manner corresponding to FIG. 3.

In a fourth embodiment shown in FIG. 9, the end portion 'C' thinner than the remaining portions as in FIG. 8 is twisted stronger than the latter so that said end portion has a much higher flexibility.

The end portion or portions of every hauling cord may be thinned at an additional step of manufacture, or alternatively during the twisting step in a heating zone of a manufacturing apparatus. It may also be possible to thin the cord while the raw elongate material is being drawn, by intermittently raising the drawing ratio.

One of the preferred thermoplastic resins is a polyester resin because it is of higher durability, pressure-resistance, tensile strength, tenacity and flexibility. Non-chloric resins such as polyolefins including polypropylenes and polyethylenes are also of good properties and thus employable in place of polyester resins.

The embodiments described above may be modified in various manner so long as they fall within the scope and spirit of the present invention, without undesirably affecting those advantages as mentioned hereinabove.

It will be understood that an octagonal, nonagonal, decagonal and the like polygonal cross sections each with more sides are less preferable in the present invention. This is because they are less slender and their helical ridges become so obtuse due to repeated uses that the cord will soon tend to behave as if it were a round one.

It will now be apparent that, according to the first embodiment shown in FIGS. 1 to 6, those helical ridges disposed around the large core region 'f' encircled with the inscribed circle 'd' will make the hauling cord 'L' slender and lighter in weight. Such a hauling cord will operate easily and smoothly due to its enhanced strength of compression and tension.

In the second and third embodiments, the end portion of the hauling cord is made flexible to such a degree that it will not encounter any difficulty even when pushed through any curved region of a conduit and thus any additional guide member can be dispensed with. In particular, any additional members such as the flexible wire connectors will no longer be jammed with the inner periphery of the conduit.

A still higher advantage may be afforded in the fourth embodiment because the features of the second embodiment are combined with those which the third embodiments give.

What is claimed is:

1. A hauling cord comprising an elongate linear body made of a thermoplastic resin and having a transverse cross section of a polygonal contour, said cord having a plurality of helical ridges that are included in the polygonal contour and each extend around, along and integral with the linear body, wherein the helical ridges are formed by drawing and twisting a raw material of the linear body, and a guide piece affixed to one end of said hauling cord, said guide piece having a hole therethrough.

2. A hauling cord as set forth in claim 1, wherein the contour defines a substantially regular polygon selected from the group consisting of a triangle, a square, a pentagon and a hexagon.

3. A hauling cord as set forth in claim 2, wherein the polygon is the triangle.

4. A hauling cord having opposite ends and an intermediate region comprising an elongate linear body made of a thermoplastic resin having a transverse cross section of a polygonal contour, and a guide piece affixed to one end of said hauling cord, said guide piece having a hole therethrough, said cord having a plurality of helical ridges that are included in the polygonal contour and each extend around, along and integral with the linear body, wherein the helical ridges are formed by drawing and twisting a raw material of the linear body, and wherein a pitch of the adjacent helical ridges in a longitudinal direction for at least one of said opposite ends of the cord is different from that for said intermediate region.

5. A hauling cord as set forth in claim 4, wherein the pitch for the at least one end is smaller than that for said intermediate region.

6. A hauling cord having opposite ends and an intermediate region comprising an elongate linear body made of thermoplastic resin and having a transverse cross section of a polygonal contour, and a guide piece affixed to one end of said hauling cord, said guide piece having a hole therethrough, said cord having a plurality of helical ridges that are included in the polygonal contour and each extend around, along and integral with the linear body, wherein the helical ridges are formed by drawing and twisting a raw material of the linear body, and wherein at least one of said opposite ends of the cord is thinner than said intermediate region.

7. A hauling cord as set forth in claim 6, wherein a pitch of the adjacent helical ridges in a longitudinal direction for at least one of said opposite ends of the cord is smaller than said intermediate region.

8. A hauling cord having opposite ends and an intermediate region comprising as an elongate linear body a monofilament made of a polyester resin and having a transverse cross section substantially of a regular triangle, and a guide piece affixed to one end of said hauling cord, said guide piece having a hole therethrough, said cord having three helical ridges each extending around, along and integral with the linear body, wherein the helical ridges are formed by drawing and twisting a raw material of the linear body, and wherein a pitch of the adjacent helical ridges in a longitudinal direction for at least one of said opposite ends of the cord is smaller than that for said intermediate region, with the at least one opposite end of the cord being thinner than said intermediate region.

9. A hauling cord comprising an elongate linear body made of a thermoplastic resin and having a transverse cross section of an irregular contour, and a guide piece affixed to one end of said hauling cord, said guide piece having a hole therethrough, said cord having at least one helical ridge extending around, along and integral with the linear body, wherein the helical ridge is formed by drawing and twisting a raw material of the linear body.

10. A hauling cord according to claim 1 wherein said guide piece is rigid and generally cylindrical with a tapered end.

11. A hauling cord according to claim 10, wherein said guide piece and said elongate linear body have approximately equivalent outside diameters.

12. A hauling cord according to claim 4 wherein said guide piece is rigid and generally cylindrical with a tapered end.

13. A hauling cord according to claim 12, wherein said guide piece and said intermediate region of said elongate linear body have approximately equivalent outside diameters.

14. A hauling cord according to claim 6 wherein said guide piece is rigid and generally cylindrical with a tapered end.

15. A hauling cord according to claim 14, wherein said guide piece and said intermediate region of said elongate linear body have approximately equivalent outside diameters.

16. A hauling cord according to claim 8 wherein said guide piece is rigid and generally cylindrical with a tapered end.

17. A hauling cord according to claim 16, wherein said guide piece and said intermediate region of said elongate linear body have approximately equivalent outside diameters.

18. A hauling cord according to claim 9 wherein said guide piece is rigid and generally cylindrical with a tapered end.

19. A hauling cord according to claim 18, wherein said guide piece and said elongate linear body have approximately equivalent outside diameters.

20. A method of cable installation through a conduit comprising the steps of:
    providing a hauling cord having an elongate linear body made of a thermoplastic resin and having a transverse cross section of a polygonal contour, said cord having a plurality of helical ridges that are included in the polygonal contour with each said ridge extending around, along and integral with said linear body;
    passing said hauling cord under compression through the conduit with an end of the hauling cord leading through the conduit;
    attaching the cable to the end; and
    drawing the hauling cord back through the conduit to draw the cable through the conduit.

21. A method of cable installation through a conduit comprising the steps of:
    providing a hauling cord having an elongate linear body with opposite ends and an intermediate region, made of a thermoplastic resin having a transverse cross section of a polygonal contour, said cord having a plurality of helical ridges that are included in the polygonal contour with each said ridge extending around, along and integral with said linear body, said helical ridges formed by drawing and twisting a raw material of the linear body, with a pitch of adjacent helical ridges in a longitudinal direction for at least one of said opposite ends of the cord being different from that for said intermediate region;
    passing said hauling cord under compression through the conduit with an end of the hauling cord leading through the conduit;
    attaching the cable to the end; and
    drawing the hauling cord back through the conduit to draw the cable through the conduit.

22. A method of cable installation through a conduit comprising the steps of:
    providing a hauling cord having an elongate linear body with opposite ends and an intermediate region, made of a thermoplastic resin and having a transverse cross section of a polygonal contour, said cord having a plurality of helical ridges that are included in the polygonal contour with each said ridge extending around, along and integral with said linear body, said helical ridges formed by drawing and twisting a raw material of said linear body, with at least one of said opposite ends of said cord being thinner than said intermediate region;
    passing said hauling cord under compression through the conduit with an end of the hauling cord leading through the conduit;
    attaching the cable to the end; and
    drawing the hauling cord back through the conduit to draw the cable through the conduit.

23. A method of cable installation through a conduit comprising the steps of:
    providing a hauling cord having an elongate linear body with opposite ends and an intermediate region, made of a monofilament polyester resin and having a transverse cross section substantially of a regular triangle, said cord having three helical ridges each extending around, along and integral with said linear body, wherein said helical ridges are formed by drawing and twisting a raw material of said linear body, with a pitch of adjacent helical ridges in a longitudinal direction for at least one of said opposite ends of said cord being smaller than that for said intermediate region, with the at least one opposite end of said cord being thinner than said intermediate region;

passing said hauling cord under compression through the conduit with an end of the hauling cord leading through the conduit;

attaching the cable to the end; and drawing the hauling cord back through the conduit to draw the cable through the conduit.

24. A method of cable installation through a conduit comprising the steps of:

providing a hauling cord having an elongate linear body made of a thermoplastic resin and having a transverse cross section of an irregular contour, said cord having at least one helical ridge extending around, along and integral with said linear body, with said helical ridge formed by drawing and twisting a raw material of said linear body;

passing said hauling cord under compression through the conduit with an end of the hauling cord leading through the conduit;

attaching the cable to the end; and drawing the hauling cord back through the conduit to draw the cable through the conduit.

* * * * *